June 27, 1944.  J. L. STRATTON  2,352,231

ELECTRIC VALVE CONTROL CIRCUIT

Filed Nov. 24, 1941

Inventor:
Jerry L. Stratton,
by Harry E. Dunham
His Attorney.

Patented June 27, 1944

2,352,231

UNITED STATES PATENT OFFICE 2,352,231

ELECTRIC VALVE CONTROL CIRCUIT

Jerry L. Stratton, Schenectady, N. Y., assignor to General Electric Company, a corporation of New York Application November 24, 1941, Serial No. 420,201

13 Claims. (Cl. 250—27)

My invention relates to electric valve control circuits and more particularly to electric circuits of the type designed to control precisely a predetermined electrical condition, such as the voltage, of an associated electric circuit.

It is frequently desirable in the control of electric systems to provide apparatus which is of simple construction and arrangement and which accurately and precisely maintains an electrical condition, such as the voltage, at a definite value. In accordance with the teachings of my invention described hereinafter, I provide a new and improved electric regulating or control system which is of simple construction and which operates to maintain the voltage of an associated electric circuit at a predetermined value, irrespective of considerable variation in characteristics of the system which may occur during operation.

It is an object of my invention to provide a new and improved electric control system.

It is another object of my invention to provide a new and improved electric control or regulating system for controlling an electrical condition, such as the voltage, of an associated electric circuit.

It is a further object of my invention to provide a new and improved electric regulating system comprising electric discharge devices for maintaining the voltage of an associated circuit at a precise value.

It is a still further object of my invention to provide a new and improved control or regulating system for dynamo-electric machines.

Briefly stated, in the illustrated embodiment of my invention I provide a new and improved control or regulating system for controlling an electrical condition, such as the voltage, of an associated electric circuit, or the output voltage of a dynamo-electric machine, such as the output voltage of a direct current generator. In accordance with certain features of my invention, I employ in the regulating system an electric discharge device of the type which employs a winding for producing a variable magnetic field which controls the output current of the discharge device and which, in turn, controls the conductivity of other electric discharge devices of the controlled type. By virtue of the use of an electric discharge device including control means of the magnetic type, I provide a highly satisfactory arrangement which may be used to interconnect low-impedance and high-impedance circuits in a regulating system, thereby making it possible to regulate with greater precision an electrical condition, such as the voltage, of low voltage circuits.

Figure 1:
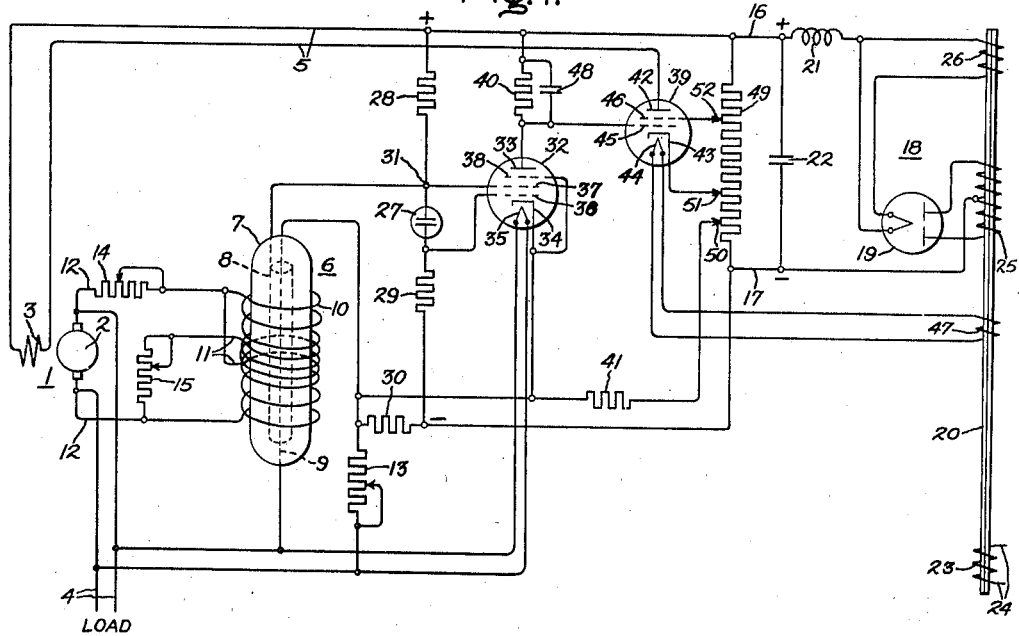
Figure 2:
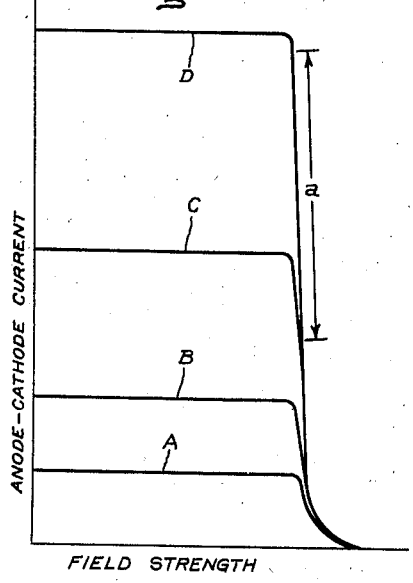
Figure 3:
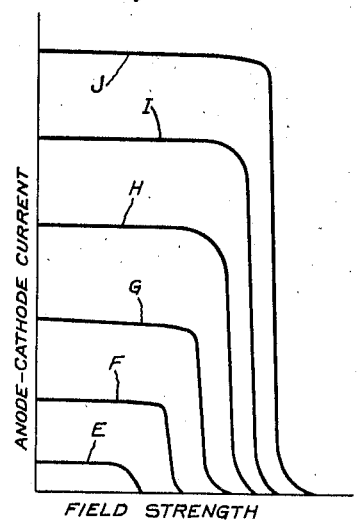

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to a control or regulating system for a direct current generator, and Figs. 2 and 3 represent certain operating characteristics of one of the electric discharge devices shown in Fig. 1.

Referring now to Fig. 1 of the drawing, my invention is there illustrated as applied to a control or regulating system for a dynamo-electric machine, such as a direct current generator 1 including an armature winding 2 and a control or field winding 3. While my invention may be applied generally to systems where it is desired to regulate an electrical condition, such as the voltage of associated circuits, it may be applied to low voltage circuits where it is desired to maintain the voltages of the circuits precisely at predetermined values. By way of example, it may be assumed that the output or armature voltage of generator 1 is of the order of magnitude of 12 or 15 volts.

A load circuit 4 is connected to the armature circuit of direct current generator 1. Field winding 3 is preferably energized through an electric circuit 5 which is variably energized by electric valve apparatus, described hereinafter, to maintain an electrical condition, such as the voltage of circuit 4, at a predetermined constant value.

I provide an electric discharge device 6 of the high vacuum type which comprises an evacuated envelope 7, an anode such as a cylindrical anode 8, and a filamentary cathode 9. The electric discharge device 6 includes electromagnetic control means which produces a magnetic field to control the amount of current transmitted between the cathode 9 and the anode 8. This control means more particularly comprises a winding 10 and may include a winding 11. The windings 10 and 11 may be wound or energized to produce opposing magnetic forces, the resultant of which determines the resultant field strength and, hence, controls the amount of current transmitted between the cathode 9 and the anode 8. In the particular arrangement illustrated, the windings 10 and 11 are shown as being wound in the same direction but energized in opposite directions due to the relative connections of the terminals of these windings to the circuit 12 which, in turn, is connected to the armature 2 of the generator 1.

Windings 10 and 11 are arranged and designed to have the same percentage variation of resistance for a predetermined temperature change of the windings in order to compensate for variations in the individual magnetomotive forces produced by said windings due to the resistance-temperature characteristics of the windings. In other words, the windings 10 and 11 are arranged so that irrespective of the temperature variations of the windings, the resultant magnetic field produced by these windings accurately varies in response to the magnitude of the armature voltage of the generator 1 or of the voltage of circuit 4.

As a means for maintaining the precision and accuracy of the electric discharge device 6 by maintaining the temperature of the cathode 9 at a substantially constant value, I energize the filament or cathode 9 from the load circuit 4 the voltage of which is maintained constant. A suitable variable impedance element, such as resistance 13, may be connected in series relation with the cathode 9 to adjust the current.

A variable impedance element, such as a resistance 14, may be connected in series relation with windings 10 and 11 to control or adjust the value of voltage which is supplied to load circuit 4. A further current-adjusting resistance 15 may be connected in series relation with winding 11 in order to control or adjust the resultant of differential magnetic field produced by windings 10 and 11.

Electric circuit 5 is energized from a source of direct current including a positive conductor 16 and a negative conductor 17. The direct current source may be supplied from a suitable rectifier 18 comprising a pair of unidirectional conducting paths provided by an electric valve 19 which may be energized from a transformer 20. Filtering means, such as a smoothing inductance 21 and a capacitance 22, may be connected across the output circuit of rectifier 18. Transformer 20 may comprise a primary winding 23 energized from a suitable source of alternating current 24 and may also include a secondary winding 25 which is connected to electric valve 19, and a further secondary winding 26 which serves as a source of filament or cathode heating current for the electric valve 19.

The anode-cathode circuit of the electric discharge device 6 is also energized from the source of direct current including conductors 16 and 17. I connect across the anode 8 and cathode 9 of electric discharge device 6 a suitable constant voltage means so that the voltage impressed across the anode and cathode remains at a substantially constant voltage, irrespective of variations in the magnitude of the voltage of the direct current source. This constant voltage means may comprise a glow discharge valve 27 comprising a pair of electrodes enclosed within an evacuated envelope and comprising an ionizable medium and having the characteristic of maintaining across its terminals a substantially constant voltage when maintained in a conducting condition. The glow discharge valve 27 may be connected across conductors 16 and 17 in series relation with an impedance element or elements, such as resistances 28 and 29. A further impedance element, such as resistance 30, may be connected in series relation with cathode 9 and negative conductor 17 of the direct current source to control the potential of grid 36 in response to the current conducted by discharge device 6. The circuit including resistances 28 and 30 and the associated connections which connect these elements to anode 8 and cathode 9 constitute an output circuit for the electric discharge device 6.

I provide an electric discharge device 32, preferably of the high vacuum type, comprising an anode 33, a cathode 34, a heating element 35 of the filamentary type, and which may include control means such as a pair of control grids 36 and 37, the latter of which may be of the screen grid type. If desired, a further grid, such as a suppressor grid 38, may be employed and connected to cathode 34. The grid 37 is connected to the common juncture 31 of resistance 28 and glow discharge device 27. To increase the sensitivity of the electric discharge device 32 which operates as an amplifier, the glow discharge device 27 is connected across the control grid 36 and screen grid 37. The potential of the control grid 36 varies in accordance with the amounts of current transmitted by electric discharge device 6 through resistance 30.

The voltage divider including resistances 28 and 29 and glow discharge device 27 is designed so that the operation of discharge device 32 is compensated for variations in the magnitude of the voltage of the direct current source including conductors 16 and 17. Resistance 29 is designed to have several times the ohmic resistance of resistance 28, so that the potential of grid 37 does not vary appreciably when the source voltage varies. However, upon variation in the source voltage the upper terminal of resistance 29 does vary exerting thereby a compensatory effect on grid 36.

Between the source of direct current including conductors 16 and 17 and the electric circuit 5, which variably energizes field winding 3, I connect an electric discharge device 39 which is also preferably of the high vacuum type, and which transmits variable amounts of current to circuit 5 in response to the current conducted by discharge device 32. An impedance element, such as resistance 40, is connected in series relation with the anode-cathode circuit of discharge device 32 and a further resistance 41 may be connected between the cathode 34 of the discharge device 32 and the source of direct current. The electric discharge device 39 includes an anode 42, a cathode 43 of the filamentary type, a cathode heating element 44, and control means such as a control grid 45 and a screen grid 46. The filament 44 may be energized from a secondary winding 47 of the transformer 23. The conductivity of electric discharge device 39 is controlled in response to the current conducted by discharge device 32. The potential of the lower terminal of the resistance 40 determines the potential of control grid 45. Anti-hunting means, such as a capacitance 48, may be connected across the terminals of resistance 40 in order to control the rate of change of the potential impressed on grid 45 under variable operating conditions.

A suitable voltage divider comprising a resistance 49 is connected across the direct current circuit including conductors 16 and 17. This resistance may be provided with a plurality of adjustable contacts or taps. An adjustable contact 50 is connected to cathode 34 of the electric discharge device 32 through resistance 41; contact 51 is connected to cathode 43, and contact 52 is connected to the grid 46 of discharge device 39.

The cathode heating element 35 of the electric discharge device 32 is connected to be energized from the load circuit 4 in order to obtain a high degree of accuracy by maintaining the cathode heating current of discharge device 32 at a substantially constant value.

The operation of the embodiment of my invention shown in Fig. 1 will be explained by considering the system when it is operating to maintain the armature voltage and the voltage applied to load circuit 4 at a substantially constant value. Briefly, the general feature of operation is the regulatory or controlling operation performed by electric discharge device 6 which varies the potential impressed upon grid 36 of electric discharge device 32 which, in turn, controls the conductivity of the electric discharge device 39 to transmit variable amounts of unidirectional current to field winding 3 of generator 1.

Considering particularly the operation of the electric discharge device 6, this discharge device is of the type in which the current transmitted between anode 8 and the cathode 9 is determined by the strength of the magnetic field produced by the joint action of windings 10 and 11. The maximum current, for a particular value of anode-cathode voltage, transmitted between the anode and the cathode occurs when the resultant field strength is zero. Under this condition of operation, the electrons emitted by cathode 9 are accelerated from cathode 9 to anode 8, due to the electrostatic field produced by the voltage impressed across the anode and cathode. This positive voltage is, of course, derived from direct current circuit including conductors 16 and 17. As the magnitude of the magnetic field produced by windings 10 and 11 is increased, the magnitude of the current transmitted between the anode and cathode is decreased. At a predetermined critical value of magnetic field strength, the current will be reduced to zero. It is, of course, well understood that when a magnetic field, such as that produced by windings 10 and 11, acts on a moving electron, or moving electrons, there will be imparted to the electrons a tangential motion causing the electrons to pursue a spiral path. As the field strength is increased, the tangential component of velocity of these electrons is correspondingly increased and consequently a smaller number of the electrons actually reach the anode 8. Of course, there is another component of magnetic field effective in the electric discharge device, and that is due to the field produced by the current flowing through the filament 9. This component of field strength causes the electrons to have a third direction of movement along the length of the filamentary cathode so that the path of any one electron acting under the total field does not lie in a plane. However, it is sufficient for the purposes of explaining the present invention to consider that the amount of current transmtted between the cathode 9 and the anode 8 is determined by the strength of the resultant magnetic field produced by windings 10 and 11.

Curves A—D of Fig. 2 represent the anode-cathode current of the electric discharge device 6 as a function of the magnetic field strength (gauss) for increasing values of cathode or filament heating current in the order named. Of course, the magnitude of the current transmitted between the anode and the cathode of electric discharge device 6 also depends upon other factors, including the geometry of the discharge device and the magnitude of the voltage impressed across the anode and the cathode. As will be explained hereinafter, it is important to maintain a constant voltage across the anode and the cathode if it is desired to maintain a predetermined relationship between the anode-cathode current and field strength. Curves E—J, inclusive of Fig. 3 represent the anode-cathode current of the electric discharge device 6 as a function of the magnetic field strength for increasing values of applied anode-cathode voltage in the order named.

If it be assumed that the voltage of the load circuit 4 increases beyond a predetermined desired value or above the predetermined value, the resultant field strength produced by windings 10 and 11 will be increased due to the increased flow of current through windings 10 and 11. As a result of the increased field strength, the current transmitted between anode 8 and cathode 9 will be decreased, causing a reduction in the current transmitted through resistance 30. Consequently, the potential of grid 36 of electric discharge device 32 will rise, causing this discharge device to transmit an increased amount of current through resistance 40. The increased flow of current through resistance 40 lowers the potential of grid 45 of discharge device 39, effectively increasing the impedance of the anode-cathode circuit of this discharge device and effecting a reduction in the magnitude of the current transmitted to field winding 3 of generator 1, thereby tending to restore the voltage of the load circuit 4 to the predetermined value. Conversely, if the voltage of the load circuit 4 tends to fall below a predetermined value, the field strength produced by windings 10 and 11 will be decreased, effecting an increase in the amount of current transmitted by discharge device 6 and effecting the reverse operation whereby the impedance of the electric discharge device 39 is decreased and consequently causing the transmission of a greater amount of current to field winding 3 and thereby raising the voltage to the precise value which it is desired to maintain.

I have found that great precision of operation is obtainable by connecting the glow discharge device 27 in circuit across the anode 8 and cathode 9 of electric discharge device 6, thereby maintaining the voltage applied thereacross at a substantially constant value. By this arrangement, the discharge device 6 is caused to operate upon a predetermined definite curve, such as one of the curves shown in Fig. 3, establishing a predetermined relationship, such as a predetermined linear relationship, between the voltage of load circuit 4, or the armature voltage of generator 1, and the current which is transmitted between the anode and cathode of discharge device 6.

I have also found that a very satisfactory degree of precision of operation is obtainable by adjusting the circuit to operate upon the straight vertical portions of the operating characteristics shown in Fig. 2, such as the portion of the curve D represented within the space *a*. That is, the anode-cathode circuit of electric discharge device 6 is caused to vary in a substantially linear manner in response to variations in the magnitude of the voltage of circuit 4, or the armature voltage of generator 1. Of course, as stated above, the output current of discharge device 6 varies inversely as the magnetic field strength, and in this particular instance inversely as the voltage of the direct current load circuit 4.

Electric discharge device 6 is operated along the straight vertical portion of the curves shown in Fig. 2. It will be noted that when this portion of the current-gauss curve is employed, the discharge device 6 is highly sensitive to small variations in field strength, thereby attaining a high degree of sensitivity of the regulating system. This abrupt change in characteristic curve is utilized in the regulating process where the voltage of circuit 4 rises above or falls below a predetermined range of values.

By virtue of the design of windings 10 and 11, I provide an arrangement whereby the accuracy of the regulating system is not disturbed by temperature variations of discharge device 6, and the windings 10 and 11 are designed or proportioned to offer the same percentage variation of resistance for a predetermined temperature change of the windings thereby compensating for the variations in the individual magnetomotive forces produced by said windings due to the resistance-temperature characteristics. Adjustment of resistance 15, which is connected in series relation with winding 11, permits control of the resultant or differential magnetomotive force produced by windings 10 and 11. Resistance 14 controls the magnitude of the resultant magnetomotive forces produced by the conjoint action of windings 10 and 11 and, hence, affords a ready arrangement for controlling the magnitude of the voltage which is impressed across load circuit 4.

By connecting the cathode 9 of electric discharge device 6 to be energized from the circuit an electrical condition of which is being regulated, such as circuit 4, the precision of operation of the discharge device 6 is increased. It is to be noted that it is highly desirable to maintain the energization of cathode 9 substantially constant in order to avoid undesirable variations in the characteristics of device 6 occasioned by extraneous variations of cathode temperature and emission. In like manner, the cathode heating element 35 of electric discharge device 32 is also energized from the regulated circuit.

The anti-hunting circuit, including capacitance 48 and resistance 40, serves to control the rate of change of the potential impressed on grid 45 of electric discharge device 39 under varying conditions, thereby preventing overshooting and under-shooting of the operation of discharge device 39 and tending to maintain the voltage applied to load circuit 4 precisely at the desired value.

The voltage divider including resistances 28 and 29 and glow discharge device 27 compensates the operation of electric discharge device 32 for variations in the magnitude of the voltage of the direct current source including conductors 16 and 17. For example, if the voltage of supply circuit 24 increases, the direct current voltage appearing across conductors 16 and 17 will also increase effecting temporarily an increase in the magnitude of the current transmitted to field winding 3 which, in the absence of a compensatory action, would tend to raise the output voltage or armature voltage of generator 1. Under this condition, the voltage impressed on grid 36 of electric discharge device 32 is correspondingly raised due to the increased voltage drop across resistance 29, effecting an increase of current transmitted through resistance 40 and thereby lowering the potential impressed on grid 45 of discharge device 39. As a result thereof, the conductivity of discharge device 39 is decreased, effecting a decrease in the current transmitted to field winding 3. In this manner, it will be appreciated that the operation of the control system is compensated for variations in voltage of the supply circuit.

I have found that my invention is particularly applicable to those arrangements where it is desired to regulate an electrical condition, such as the voltage, of a low-impedance, low-voltage circuit. In many arrangements in order to effect the ultimate control desired, one step of the control may necessitate the use of a voltage amplifier. The use of a voltage amplifier requires generally a relatively high-impedance input circuit in order that an appreciable signal voltage be obtained. When the signal voltage is derived initially from a low-impedance, low-voltage circuit, such as circuit 4, some means which is highly accurate must be employed between the low-impedance circuit and the voltage amplifier. By the use of the electric discharge device 6, the interconnection of the low-impedance and the high-impedance stages is readily obtained without sacrificing precision of operation. Small variations in the magnitude of the relatively low magnitude voltage to be regulated are effectively utilized to control the operation or conductivity of the electric discharge device 6, and the output of the electric discharge device 6 may be connected to the relatively high-impedance input circuits of voltage amplifiers such as electric discharge devices 32 and 39. In this manner, the cascading of amplifier circuits between low-impedance circuits and high-impedance circuits is provided without sacrificing precision of operation of the regulating system as a whole.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a low-voltage, low-impedance electric circuit, an electric discharge device of the type comprising an anode, a cathode and electromagnetic control means connected to said electric circuit, said control means comprising a winding for producing a magnetic field which controls the current transmitted between said anode and said cathode, a second electric circuit, a source of current, a second electric discharge device of the high-vacuum type for controlling the energization of said second circuit and having an anode-cathode circuit connected to said second electric circuit and having a grid for controlling the conductivity thereof, and a high-impedance circuit connected to said grid for controlling the potential thereof and including means connected to said anode and said cathode of the first-mentioned electric discharge device.

2. In combination, a low-voltage, low-impedance electric circuit, an electric discharge device of the type comprising an anode, a cathode and electromagnetic control means connected to said circuit, said control means comprising a winding for producing a magnetic field which controls the current transmitted between said anode and said cathode, a source of current, a second electric discharge device of the high vacuum type for controlling the energization of said second circuit and having an anode-cathode circuit connected to said second electric circuit and comprising a grid for controlling the conductivity thereof, and a high-impedance circuit connected between said grid and said anode and cathode for controlling the potential of said grid in accordance with the conductivity of the first-mentioned electric discharge device.

3. In combination, an electric circuit, an electric discharge device of the type comprising an anode, a cathode and an electromagnetic control means comprising a winding connected to said electric circuit for producing a magnetic field which controls the current conducted between said anode and said cathode, a second circuit, a source of direct current, means for controlling the energization of said second electric circuit comprising an electric discharge device having a grid, said second discharge device being connected between said second electric circuit and said source, means for controlling the potential of said grid comprising a third electric discharge device having a pair of control grids, a voltage divider connected across said source and comprising in series relation an impedance element and a glow discharge device, said glow discharge device being connected across said grids, and means for controlling the potential of one of the last-mentioned grids in response to the current conducted by the first-mentioned electric discharge device and comprising said impedance element.

4. In combination, an electric circuit, an electric discharge device of the type comprising an anode, a cathode and an electromagnetic control means comprising a winding connected to said circuit for producing a magnetic field the magnitude of which varies in response to an electrical condition of said electric circuit thereby controlling the flow of current between said anode and said cathode, a second electric circuit, a source of direct current, means connected between said second electric circuit and said source and comprising an electric discharge device having a grid, means for controlling the potential of said grid comprising a circuit including a serially connected resistance and a third electric discharge device connected across said source, said third electric discharge device including a pair of control grids, a voltage divider connected across said source including in series relation a second resistance and a glow discharge device connected across said pair of control grids, and means for connecting said anode and said cathode in series relation with said second resistance across said source so that the variation in current transmitted through said second resistance impresses a variable control potential on at least one of said pair of grids.

5. In combination, an electric circuit, an electric discharge device of the type comprising an anode, a cathode and an electromagnetic control means connected to said electric circuit, said control means comprising a pair of windings for producing opposing magnetomotive forces the resultant of which controls the current transmitted between the anode and cathode, an output circuit connected to said anode and said cathode, said pair of windings being designed to have the same percentage variation of resistance for a predetermined temperature change of said windings thereby compensating for the variations in the individual magnetomotive forces produced by said windings due to the resistance-temperature characteristics.

6. In combination, an electric circuit, an electric discharge device of the type comprising an anode, a filamentary cathode and electromagnetic control means including a winding connected to said electric circuit for producing a magnetic field which controls the current transmitted between said anode and said cathode, a source of direct current connected to said anode and said cathode, means comprising a constant voltage device connected across said anode and said cathode, and an output circuit connected to said anode and said cathode.

7. In combination, an electric circuit, an electric discharge device of the type comprising an anode, a cathode and an electromagnetic control means comprising a winding connected to said electric circuit for producing a magnetic field which controls the current transmitted between said anode and said cathode, a source of direct current connected to said anode and said cathode, means comprising a glow discharge valve connected across said anode and said cathode for maintaining the voltage applied thereacross substantially constant, and an output circuit connected to said anode and said cathode.

8. In combination, an electric circuit, an electric discharge device of the type comprising an anode, a cathode of the filamentary type and electromagnetic control means comprising a winding connected to said electric circuit for producing a magnetic field to control the current transmitted between said anode and said cathode, a source of direct current connected to said anode and said cathode, means connected across said anode and said cathode comprising a constant voltage device to maintain the voltage impressed across said anode and said cathode at a substantially constant value so that the current transmitted between said anode and said cathode varies substantially linearly in accordance with a predetermined electrical condition of said electric circuit, a second electric circuit, means comprising a second electric discharge device for controlling the energization of said second electric circuit, said second electric discharge device including a grid, and means for controlling the potential of said grid in accordance with the current conducted between said anode and said cathode.

9. In combination, an electric circuit, an electric discharge device of the type comprising an anode, a cathode and electromagnetic control means connected to said electric circuit, said control means comprising a pair of windings for producing opposing magnetomotive forces the resultant of which controls the current transmitted between said anode and said cathode, a source of direct current connected to said anode and said cathode, an output circuit connected to said anode and said cathode, said pair of windings being designed to have the same percentage variation of resistance for a predetermined temperature change of said windings thereby compensating for the variations in the individual magnetomotive forces produced by said windings due to the resistance-temperature characteristics thereof, and means connected across said anode and said cathode and comprising a constant voltage device for maintaining the anode-cathode voltage of the first mentioned discharge device substantially constant thereby maintaining a substantially linear relationship between an electrical condition of said output circuit and a predetermined electrical condition of the first mentioned electric circuit.

10. In combination, an electric circuit, means for controlling an electrical condition of said electric circuit, an electric discharge device of the type comprising an anode, a filamentary cathode and electromagnetic control means comprising a winding connected to said electric circuit for producing a magnetic field which controls the current transmitted between said anode and said cathode in accordance with a predetermined electrical condition of said electric circuit, a source of direct current connected to said anode and said cathode, a second electric circuit connected between said anode and said cathode and the first mentioned means to control said electrical condition, and means comprising a constant voltage device connected across said anode and said cathode to maintain the voltage impressed thereacross at a substantially constant value thereby maintaining a substantially linear relation between the current conducted by said electric discharge device and said electrical condition of the first mentioned electric circuit.

11. In combination, an electric circuit, means for controlling an electrical condition of said electric circuit, an electric discharge device of the type comprising an anode, a filamentary cathode and electromagnetic control means comprising a winding connected to said electric circuit for producing a magnetic field which controls the current transmitted between said anode and said cathode in accordance with a predetermined electrical condition of said electric circuit, a source of direct current connected to said anode and said cathode, a second electric circuit connected between said anode and said cathode and the first mentioned means to control said electrical condition, means comprising a constant voltage device connected across said anode and said cathode to maintain the voltage impressed thereacross at a substantially constant value thereby maintaining a substantially linear relation between the current conducted by said electric discharge device and said electrical condition of the first mentioned electric circuit, and means for energizing said filamentary cathode from the first mentioned electric circuit.

12. In combination, an electric circuit, means for variably energizing said electric circuit for controlling a predetermined electrical condition thereof, an electric discharge device of the type comprising an anode, a cathode and an electromagnetic control means including a winding connected to said circuit for producing a magnetic field and for controlling the current transmitted between said anode and said cathode in accordance with said electrical condition, a source of direct current connected to said anode and said cathode, a second electric circuit connected to the first mentioned means for controlling the operation thereof, means connected across said anode and said cathode for maintaining the voltage impressed thereacross substantially constant and comprising a glow discharge valve, means for controlling the energization of said second electric circuit comprising a second electric discharge device having an anode, a filamentary cathode and at least one control grid, means for controlling the potential of said grid in accordance with the current conducted by the first mentioned electric discharge device, and means for energizing the filamentary cathodes of the first mentioned and second mentioned electric discharge devices from the first mentioned electric circuit.

13. In combination, an electric circuit, an electric discharge device of the type comprising an anode, a filamentary cathode and electromagnetic control means connected to said electric circuit, said control means comprising a pair of windings for producing opposing magnetomotive forces the resultant of which controls the current transmitted between said anode and cathode, a source of direct current connected to said anode and said cathode, an output circuit connected to said anode and said cathode, said pair of windings being connected to have the same percentage variation of resistance for a predetermined temperature change of said windings thereby compensating for the variations in the individual magnetomotive forces produced by said windings due to the resistance-temperature characteristics thereof, and means for energizing said cathode from the first mentioned electric circuit.

JERRY L. STRATTON.